(12) United States Patent
Sochacki et al.

(10) Patent No.: US 12,109,687 B2
(45) Date of Patent: Oct. 8, 2024

(54) MECHANICAL DEVICE FOR GRASPING OBJECTS

(71) Applicant: Ford Global Technologies, LLC, Dearborn, MI (US)

(72) Inventors: Bradley Sochacki, Dearborn, MI (US); Evan Lovell Hardy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 814 days.

(21) Appl. No.: 17/219,920

(22) Filed: Apr. 1, 2021

(65) Prior Publication Data
US 2022/0314462 A1   Oct. 6, 2022

(51) Int. Cl.
*B25J 15/00*   (2006.01)
*B25J 15/08*   (2006.01)

(52) U.S. Cl.
CPC ......... *B25J 15/083* (2013.01); *B25J 15/0033* (2013.01)

(58) Field of Classification Search
CPC .. B25J 15/083; B25J 15/0293; B25J 15/0033; B66C 1/28; B66C 1/30; B66C 1/422; B66C 1/44; B66C 1/442
USPC ..... 294/62, 63.1, 81.54, 81.62, 67.33, 103.1
See application file for complete search history.

(56) References Cited

U.S. PATENT DOCUMENTS

| | | | | |
|---|---|---|---|---|
| 1,492,999 | A * | 5/1924 | Mercer | B66C 1/28 |
| | | | | 294/103.1 |
| 4,336,962 | A * | 6/1982 | Read | B66C 1/442 |
| | | | | 294/67.33 |
| 4,595,222 | A * | 6/1986 | Schumacher | H01L 21/68707 |
| | | | | 294/34 |
| 4,878,705 | A | 11/1989 | Arnquist | |
| 7,240,934 | B2 * | 7/2007 | Lausell | B65G 7/12 |
| | | | | 294/16 |
| 10,227,217 | B2 * | 3/2019 | Cveykus | B66C 1/422 |

FOREIGN PATENT DOCUMENTS

| | | |
|---|---|---|
| CN | 104690586 | 6/2015 |
| CN | 108115717 | 6/2018 |
| CN | 108748244 | 11/2018 |

* cited by examiner

*Primary Examiner* — Dean J Kramer
(74) *Attorney, Agent, or Firm* — Burris Law, PLLC

(57) ABSTRACT

A mechanical device includes opposed frame members and an actuator assembly. The opposed frame members are slidably coupled to each other in a longitudinal direction. The opposed frame members are biased away from each other. The actuator assembly is mounted to the opposed frame members and includes an actuator and a locking member. The actuator includes an engagement pad and at least one lateral protrusion. The actuator being slidably disposed relative to one of the opposed frame members along the longitudinal direction. The locking member is kinematically coupled to the actuator and slidably disposed relative to the other opposed frame member. The locking member includes an inclined surface adapted to engage the at least one lateral protrusion.

20 Claims, 18 Drawing Sheets

MECHANICAL DEVICE FOR GRASPING OBJECTS

FIELD

The present disclosure relates to a mechanical device for grasping objects.

BACKGROUND

The statements in this section merely provide background information related to the present disclosure and may not constitute prior art.

A powered exoskeleton, also known as an exo-suit, is a wearable mobile apparatus that is powered by electric motors, pneumatics, levers, hydraulics or a combination thereof to aid a wearer in his/her limb movement with increased strength and endurance. For example, the exo-suit can help the wearer lifting or moving a heavy object by sharing some of the load from the object. The exo-suit includes sensors to sense motion of the wearer, and send a signal to a controller which controls the movement of various components of the exo-suit according to the wearer's motion. The exo-suit provides support for the shoulders, waist and thighs of the wearer, and assists the user in lifting, holding, and moving heavy objects.

Exo-suits have been used to aid in moving tubing and square stocks in plants and factories along with other automotive equipment. The exo-suits require end-of-arm tooling devices to pick up objects. Typically, the end-of-arm tooling devices are specially designed to pick up or lift certain items, but not other items due to their different shapes and sizes. Therefore, a variety of the end-of-arm tooling devices need to be in stock for handling objects having different configurations and sizes, thereby increasing operational costs.

Moreover, the end-of-arm tooling devices for the exo-suits are typically actuated by power sources. When the exo-suits are losing power during material handling, the objects being held by the end-of-arm tooling devices may not be moved efficiently thus disrupting manufacturing operations.

These issues related to the use of end-of-arm tooling devices, such as by way of example those used in exo-skeleton suits, are addressed by the present disclosure.

SUMMARY

This section provides a general summary of the disclosure and is not a comprehensive disclosure of its full scope or all of its features.

In one form, the present disclosure discloses a mechanical device for grasping an object. The mechanical device includes opposed frame members and an actuator assembly. The opposed frame members are slidably coupled to each other in a longitudinal direction. The opposed frame members are biased away from each other. The actuator assembly is mounted to the opposed frame members and includes an actuator and a locking member. The actuator includes an engagement pad and at least one lateral protrusion. The actuator being slidably disposed relative to one of the opposed frame members along the longitudinal direction. The locking member is kinematically coupled to the actuator and slidably disposed relative to the other opposed frame member. The locking member includes an inclined surface adapted to engage the at least one lateral protrusion.

In some configurations, a first biasing device engages the opposed frame members.

In some configurations, one of the opposed frame members includes an opening that receives the first biasing device and a portion of the other frame member.

In some configurations, a second biasing device engages one opposed frame member and the locking member and biases the locking member away from the one opposed frame member.

In some configurations, the first and second biasing devices are springs.

In some configurations, each of the opposed frame members includes a finger extending from an end thereof and adapted to hold the object. The fingers extend toward each other.

In some configurations, each of the opposed frame members are C-shaped.

In some configurations, a gripping pad is coupled to the engagement pad of the actuator and adapted to facilitate grasping of the object.

In some configurations, a fastener extends through the actuator and the other opposed frame member to secure the actuator and the other opposed frame member to each other.

In another form, the present disclosure discloses opposed frame members and an actuator assembly. The opposed frame members are slidably coupled to each other in a longitudinal direction and are biased away from each other. The actuator assembly is mounted to the opposed frame members and includes an actuator and a locking member. The actuator being slidably disposed relative to one of the opposed frame members along the longitudinal direction and comprising an engagement pad. The locking member is coupled to the actuator. The locking member being biased away from the one opposed frame member and slidably disposed relative to the other opposed frame member. One of the actuator and the locking member comprises at least one lateral protrusion and the other of the actuator and the locking member comprises at least one recess having an inclined surface adapted to engage the at least one lateral protrusion. The locking member is adapted to move in a vertical direction when the inclined surface engages the at least one lateral protrusion.

In some configurations, a first biasing device engages the opposed frame members and biases the opposed frame members away from each other.

In some configurations, a second biasing device engages the one opposed frame member and the locking member and biases the locking member away from the one opposed frame member.

In yet another form, the present disclosure discloses a mechanical device for grasping an object. The mechanical device includes first and second opposed frame members and an actuator assembly. The first and second opposed frame members are slidably coupled to each other in a longitudinal direction. The first and second frame members being biased away from each other. The actuator assembly is mounted to the first and second frame members and includes an actuator and a locking member. The actuator being slidably disposed relative to the first frame member along the longitudinal direction and comprising a body, an engagement pad and a plurality of protrusions. A first protrusion of the plurality of protrusions extends laterally from a first side of the body and a second protrusion of the plurality of protrusions extends laterally from a second side of the body that opposes the first side of the body. The locking member moveably coupled to the actuator in a vertical direction and comprising a plurality of first side arms and a plurality of second side arms. Each of the first and second side arms includes a recess having an inclined surface adapted to engage a respective first and second protrusion of the plurality of the protrusions.

In some configurations, the first frame member comprises a first beam member and a second beam member. The first beam member has a first elongated opening extending in the longitudinal direction and adapted to receive the first protrusion. The second beam member cooperates with the first beam member to house the body of the actuator. The second beam member has a second elongated opening extending in the longitudinal direction and adapted to receive the second protrusion.

In some configurations, the mechanical device further includes an upper plate, first, second and third fasteners, and a biasing device. The first fastener extends through the upper plate and at least partially through a first attachment member connecting the first side arms to each other. The second fastener extends through the upper plate and at least partially through a second attachment member connecting the second side arms to each other. The biasing device engages the first frame member and the locking member and biases the locking member away from the first frame member. The third fastener extends through the upper plate, the body of the actuator, the biasing device, and the locking member.

In some configurations, the body includes an elongated slot extending in the longitudinal direction. The third fastener extends through the elongated slot.

In some configurations, the locking member is C-shaped.

In some configurations, a biasing device engages the first and second frame members.

In some configurations, a biasing device engages the first frame member and the locking member.

In some configurations, the first and second protrusions of the actuator are configured to be received in gaps between two sets of opposing first and second side arms to inhibit the actuator and the second frame member from moving in the longitudinal direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
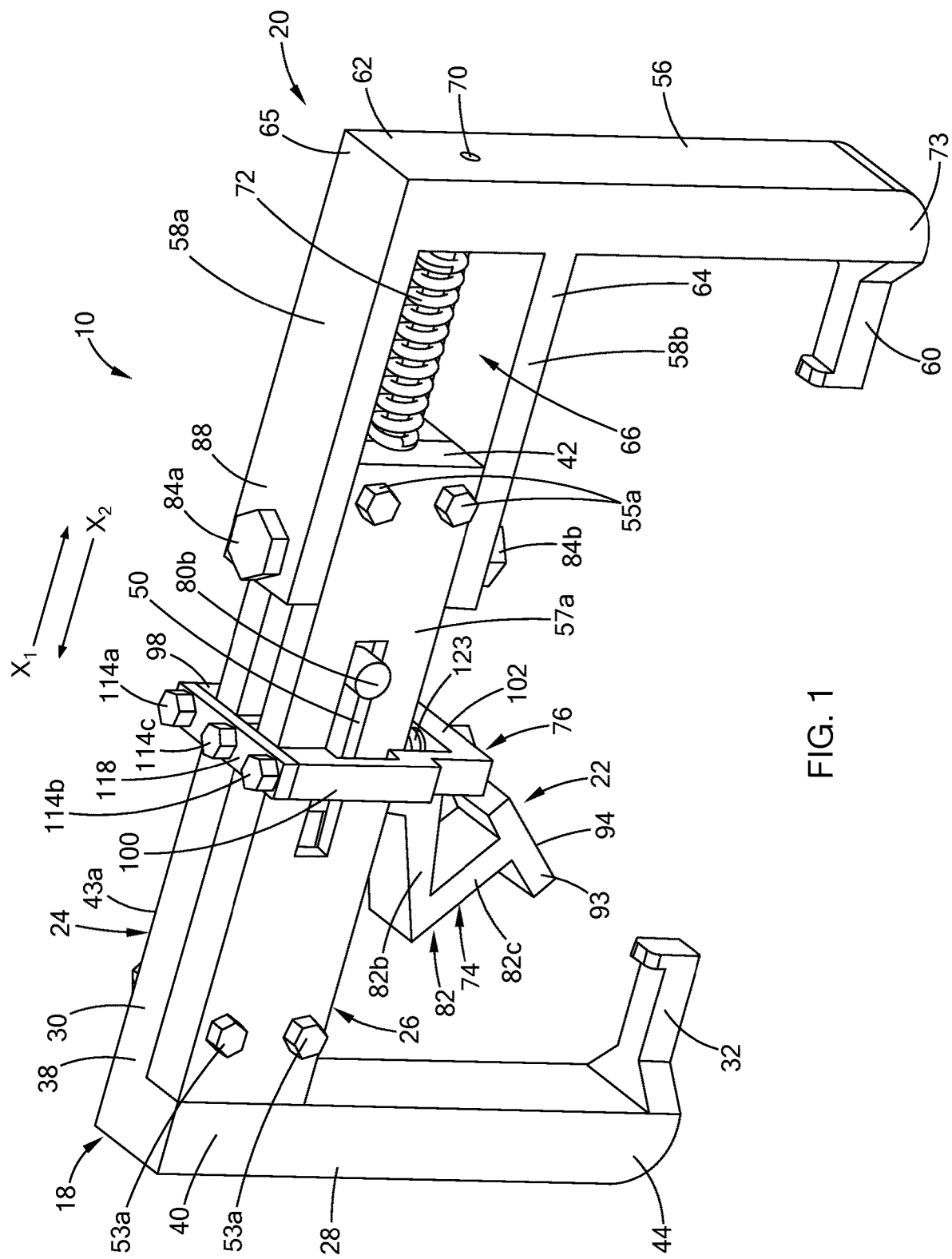
FIG. 1 is a perspective view of a mechanical device in an unlocked position according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-10, a mechanical device 10 is provided. The mechanical device 10 may be used for grabbing objects such as automotive parts. For example, the mechanical device 10 may be used in grabbing engines, transmissions, differentials and battery packs and moving them from one place to another. The mechanical device 10 includes a first frame member 18, a second frame member 20, and an actuation assembly 22. The first and second opposed frame members 18, 20 are C-shaped and are slidably coupled to each other in a longitudinal direction.

Figure 2:
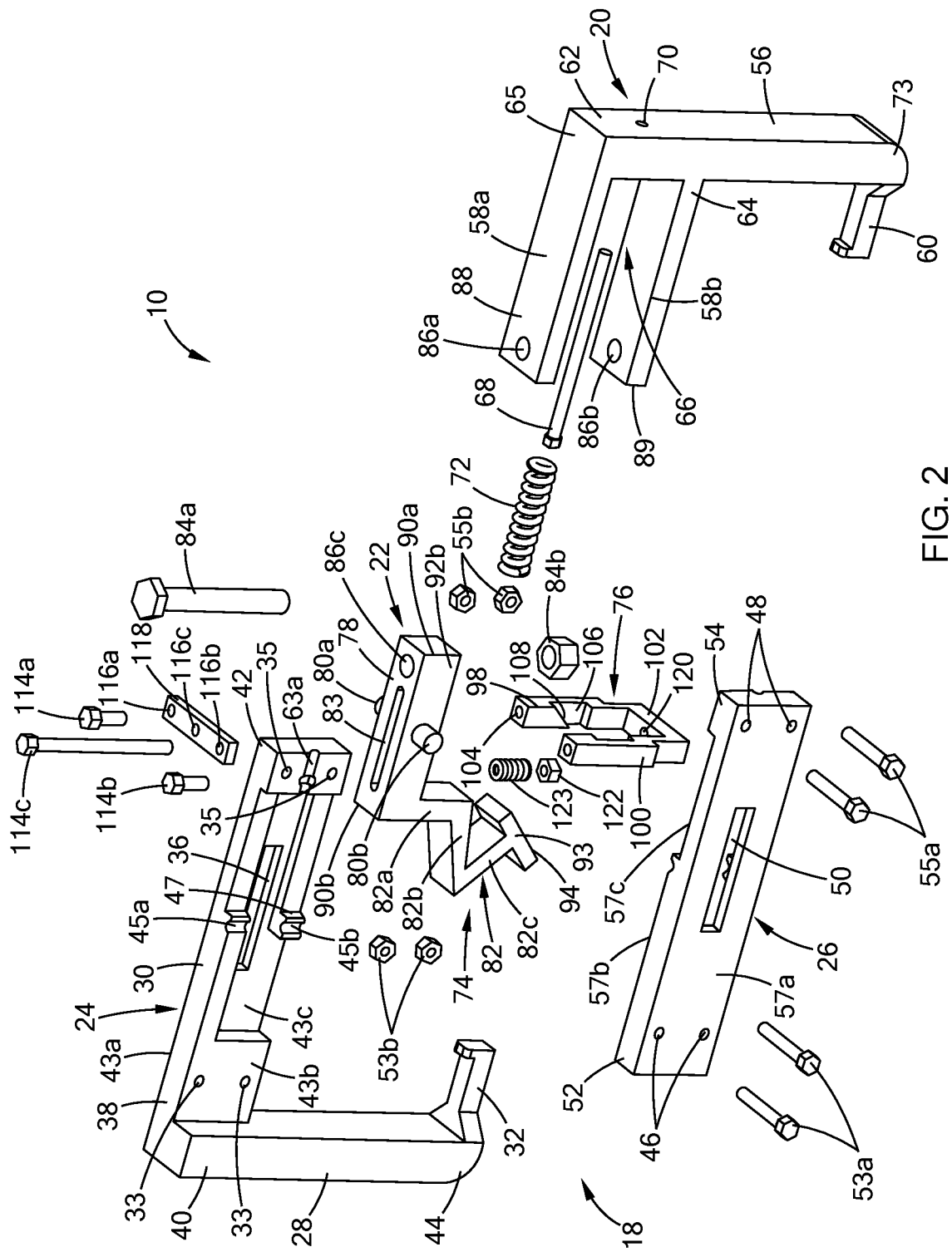
FIG. 2 is an exploded view of the mechanical device of FIG. 1.
Figure 3:
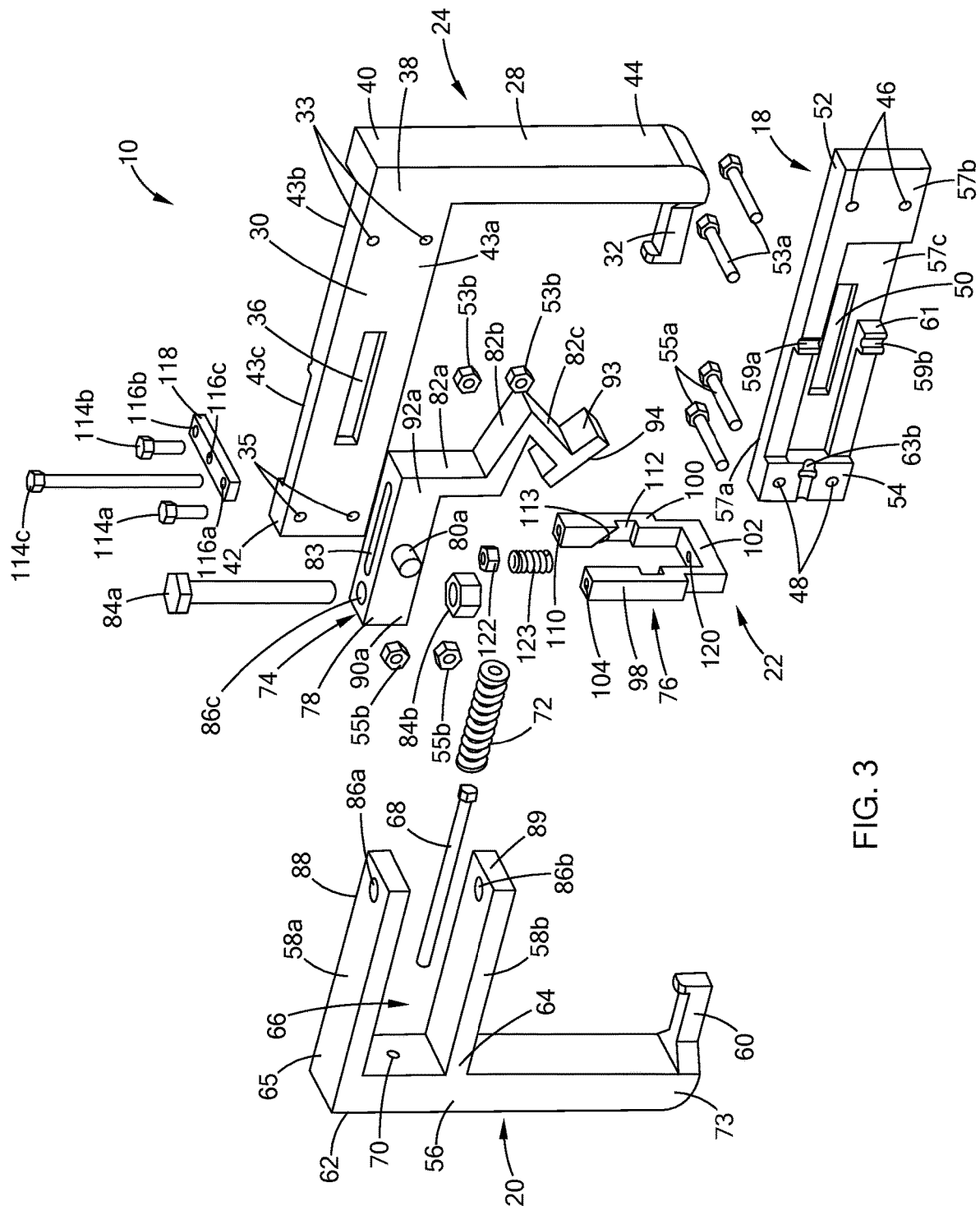
FIG. 3 is another exploded view of the mechanical device of FIG. 1.

The first frame member 18 includes a first beam member 24 and a second beam member 26 coupled to the first beam member 24. The first beam member 24 includes a support post 28, an arm 30, and a finger 32. As shown in FIGS. 2 and 3, the arm 30 includes a plurality of first apertures 33, a plurality of second apertures 35 and an elongated opening 36. A proximal end 38 of the arm 30 extends from an upper or first end 40 of the support post 28 in a first longitudinal direction X1. The plurality of first apertures 33 are formed in the arm 30 at or near the proximal end 38. The plurality of second apertures 35 are formed in the arm 30 at or near a distal end 42. The elongated opening 36 is rectangular-shaped and extends in the longitudinal direction. The elongated opening 36 is located between the proximal end 38 and the distal end 42, and is adapted to receive the actuation assembly 22.

As shown in FIG. 2, the arm 30 also includes an outside surface 43a, a first inside surface 43b and a second inside surface 43c (the first and second inside surfaces 43b, 43c face toward the second beam member 26 and away from the outside surface 43a). The first inside surface 43b extends further laterally inwardly than the second inside surface 43c.

The first inside surface 43b includes a semi-cylindrical groove 45a formed therein. A protrusion 47 extends from the second inside surface 43c and includes a semi-cylindrical groove 45b formed therein. The groove 45b is vertically aligned with the groove 45a.

The finger 32 extends from a lower or second end 44 of the support post 28 in the first longitudinal direction X1 (the finger 32 and the arm 30 are parallel to each other). In some configurations, the finger 32 may be angled relative to the arm 30. The finger 32 is also adapted to grab or hold the object being moved from one place to another. In some configurations, a gripping pad may be coupled to the finger 32 to facilitate grip of the object being moved from one place to another. In other configurations, the finger 32 may be removed and replaced with a gripping pad (not shown) coupled to the support post 28.

The second beam member 26 cooperates with the first beam member 24 to house a portion of the actuation assembly 22. As shown in FIGS. 2 and 3, the second beam member 26 includes a plurality of first apertures 46, a plurality of second apertures 48 and an elongated opening 50. The plurality of first apertures 46 are formed in the second beam member 26 at or near a first end 52 of the second beam member 26 (the first end 52 is adjacent to the proximal end 38 of the arm 30). Each first aperture 46 is aligned with a respective first aperture 33 of the arm 30. In this way, a fastener 53a such as a bolt or screw may extend through each first aperture 33, 46, thereby coupling the first and second beam members 24, 26 to each other. A nut 53b may be threadably engaged to each fastener 53a. The plurality of second apertures 48 are formed in the second beam member 26 at or near a second end 54 of the second beam member 26 (the second end 54 is adjacent to the distal end 42 of the arm 30). Each second aperture 48 is aligned with a respective second aperture 35 of the arm 30. In this way, a fastener 55a such as a bolt or screw, for example, may extend through each second aperture 35, 48, thereby further coupling the first and second beam members 24, 26 to each other. A nut 55b may be threadably engaged to each fastener 55a.

The elongated opening 50 is rectangular-shaped and extends in the longitudinal direction. The elongated opening 50 is aligned with the elongated opening 36 of the arm 30, and is adapted to receive the actuation assembly 22.

As shown in FIG. 3, the second beam member 26 also includes an outside surface 57a, a first inside surface 57b and a second inside surface 57c (the first and second inside surfaces 57b, 57c face toward the arm 30 of the first beam member 24 and away from the outside surface 57a). The first inside surface 57b extends further laterally inwardly than the second inside surface 57c. The first inside surface 57b includes a semi-cylindrical groove 59a formed therein. A protrusion 61 extends from the second inside surface 57c and includes a semi-cylindrical groove 59b formed therein. The groove 59b is vertically aligned with the groove 59a. When the second beam member 26 is coupled to the arm 30 of the first beam member 24, the groove 59a cooperates with the groove 45a of the arm 30 to form a cylindrical-shaped opening and the groove 59b cooperates with the groove 45b of the arm 30 to form a cylindrical-shaped opening.

Figure 4:
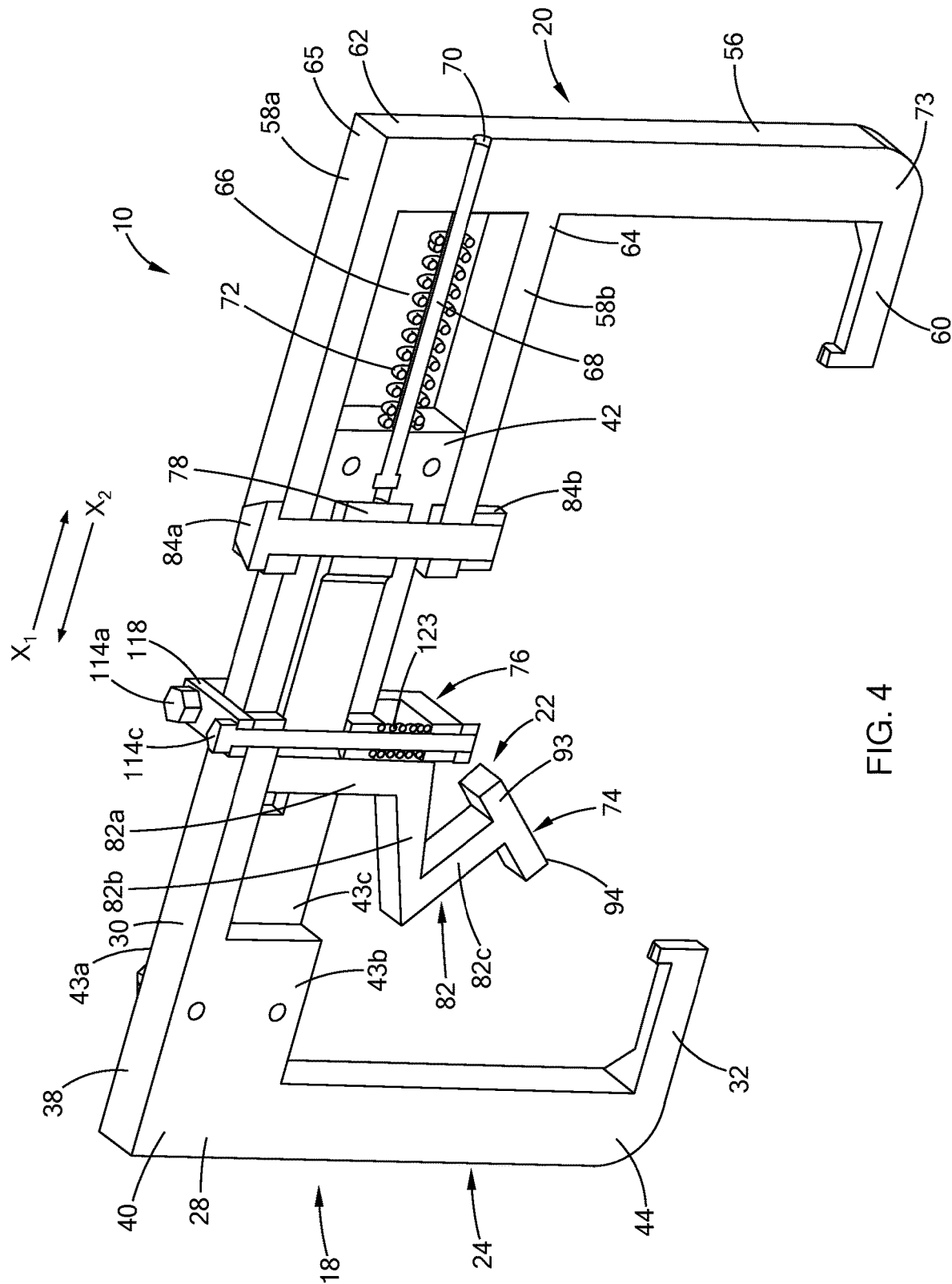
FIG. 4 is a cross-sectional view of the mechanical device of FIG. 1.
Figure 6:
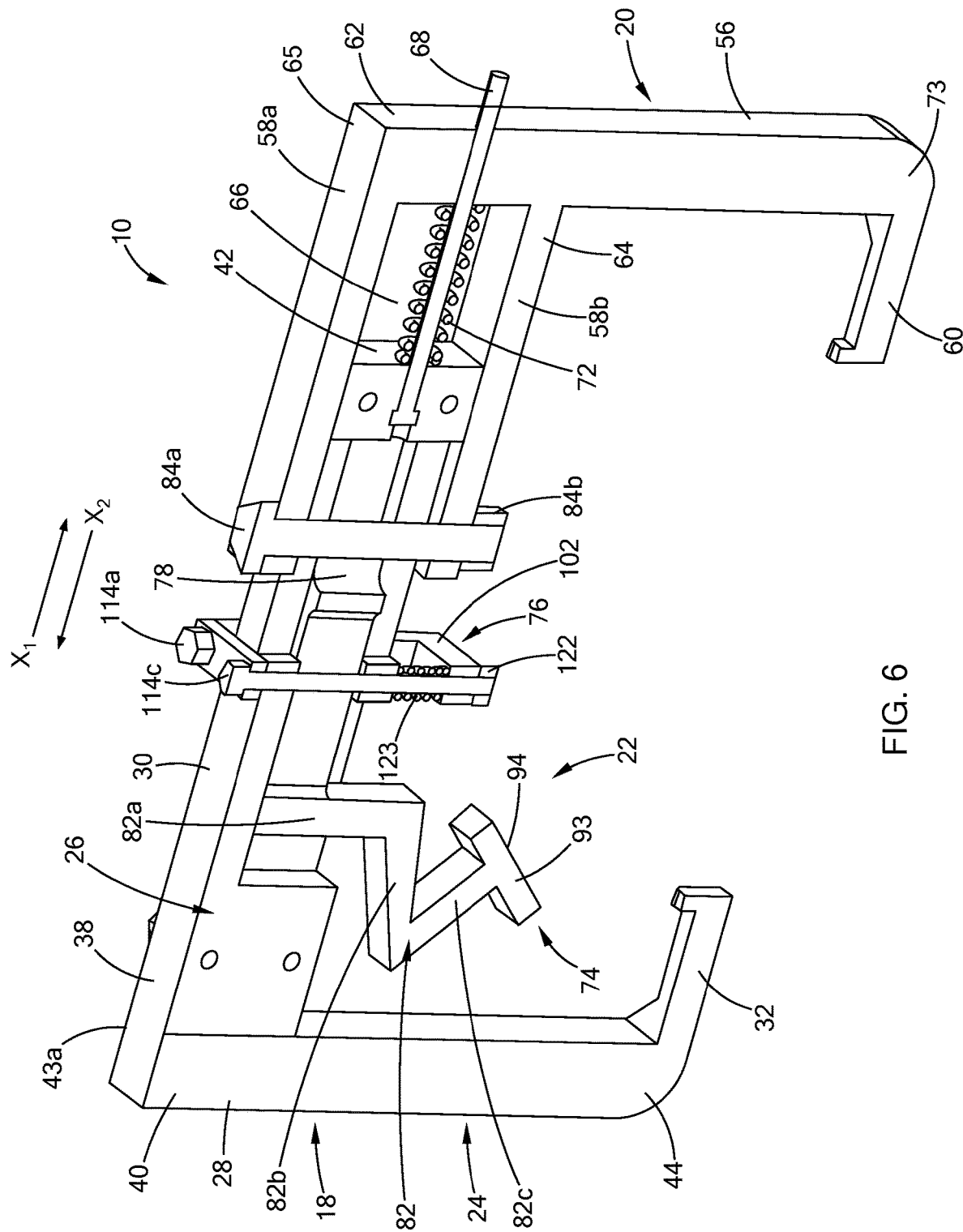
FIG. 6 is a cross-sectional view of the mechanical device of FIG. 5.
Figure 7:
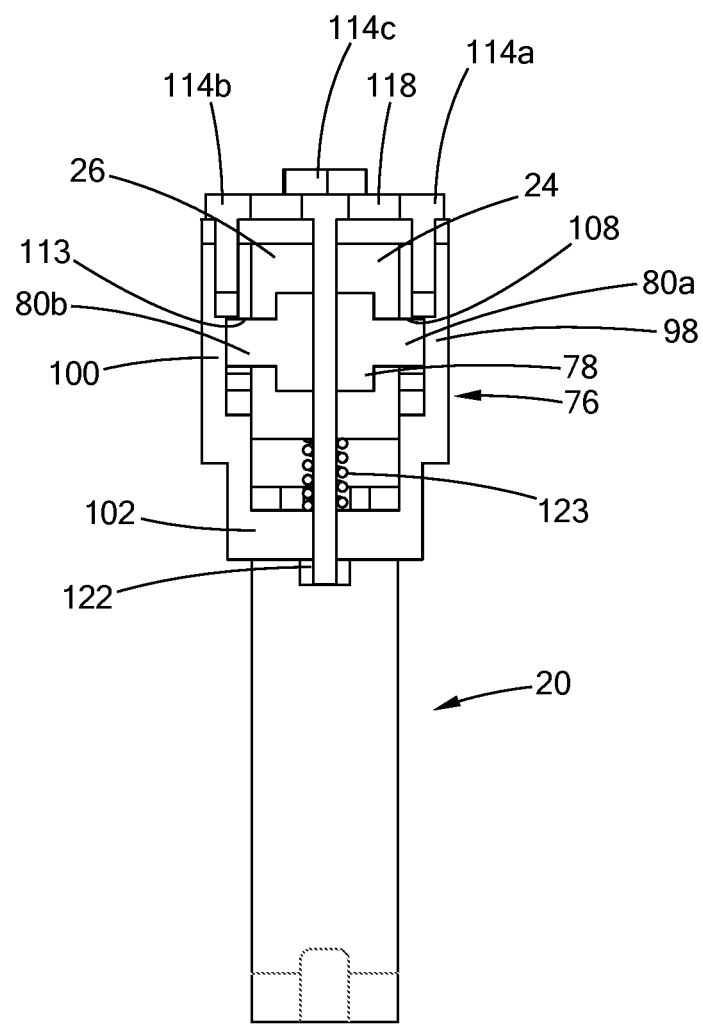
FIG. 7 is another cross-sectional view of the mechanical device of FIG. 5.
Figure 8:
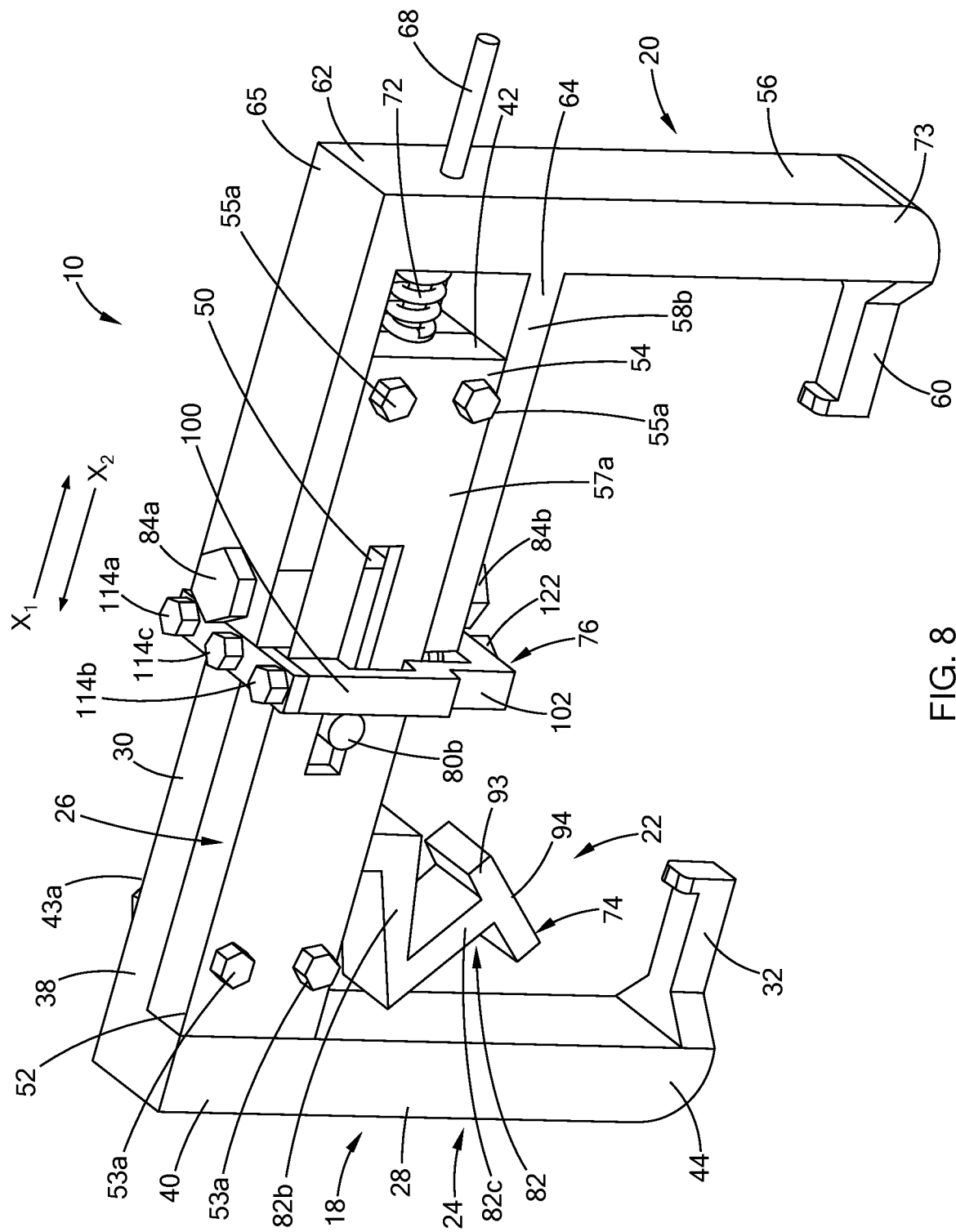
FIG. 8 is a perspective view of the mechanical device in the locked position.
Figure 9:
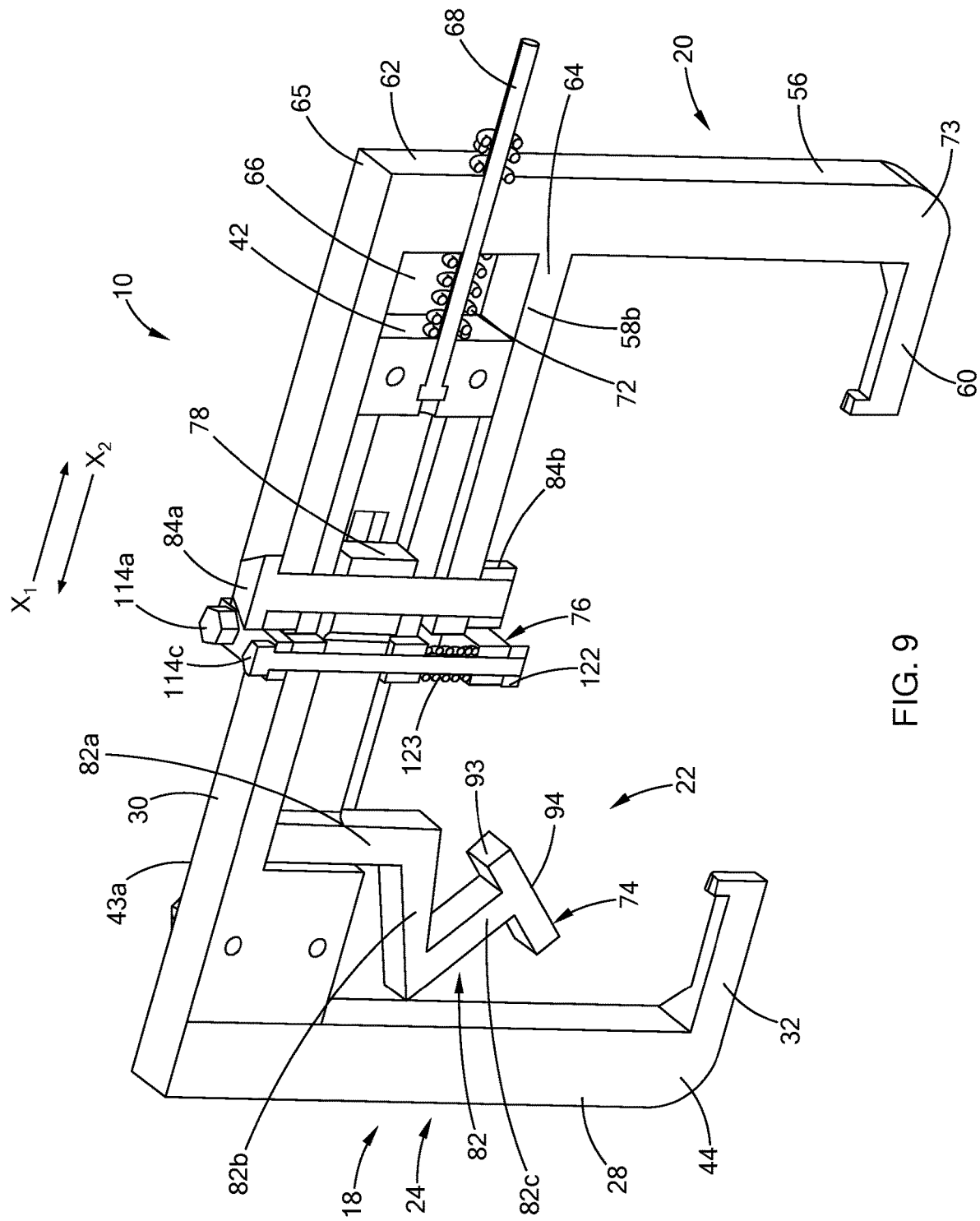
FIG. 9 is a cross-sectional view of the mechanical device of FIG. 8.

The first inside surface 43b of the arm 30 includes a groove 63a formed therein at the distal end 42 and the first inside surface 57b of the second beam member 26 includes a groove 63b formed therein at the second end 54. When the second beam member 26 is coupled to the arm 30 of the first beam member 24, the groove 63a cooperates with the groove 63b of the arm 30 to form a stepped opening that extends in the longitudinal direction (FIGS. 4, 6, and 9). The stepped opening is also formed between two of the second apertures 35 of the arm 30 and two of the second apertures 48 of the second beam member 26.

With reference to FIGS. 1-10, the second frame member 20 includes a support post 56, a first arm 58a, a second arm 58b, and a finger 60. A proximal end 65 of the first arm 58a extends from an upper or first end 62 of the support post 56 in a second longitudinal direction X2 (the second longitudinal direction X2 is opposite the first longitudinal direction X1). A proximal end 64 of the second arm 58b is located between the first arm 58a and the finger 60 and extends from the support post 56 in the second longitudinal direction X2. The first arm 58a and the second arm 58b are spaced apart from each other thereby defining a space 66 that receives the first and second beam members 24, 26 of the first frame member 18.

As shown in FIGS. 4, 6, and 9, a fastener 68 is retained in the stepped opening and extends at least partially through an opening 70 in the support post 56 of the second frame member 20. In this way, the second frame member 20 is slidably coupled to the first frame member 18. In some configurations, the fastener 68 may be disengaged (i.e., not received within the opening 70) from the opening 70 when the device 10 is in the open position. A biasing device 72 (e.g., a spring) surrounds a portion of the fastener 68 and is located within the space 66 formed between the arms 58a, 58b. The biasing device 72 engages the support post 56 and the first and second beam members 24, 26. In this way, the biasing device 72 biases the first and second frame members 18, 20 away from each other in the longitudinal direction. Although the biasing device 72 is shown as a spring, the biasing device 72 may be an elastomeric pad or any other suitable device that is allowed to bias the first and second frame members 18, 20 away from each other.

The finger 60 extends from a lower or second end 73 of the support post 56 in the second longitudinal direction X2 (the finger 60 and the finger 32 extend toward each other). The finger 60 is also adapted to grab or hold the object being moved from one place to another. In some configurations, a gripping pad may be coupled to the finger 60 to facilitate grip of the object being moved from one place to another. In other configurations, the finger 60 may be removed and replaced with a gripping pad (not shown) coupled to the support post 56.

With reference to FIGS. 1-10, the actuation assembly 22 includes an actuator 74 and a locking member 76. The actuator 74 is coupled to the second frame member 20 and is slidably disposed relative to the first frame member 18. The actuator 74 includes a body 78, a pair of protrusions 80a, 80b, and an arm 82. The body 78 is housed by the first and second beam members 24, 26 and includes an elongated opening 83 formed therein and extending in the longitudinal direction. A fastener 84a extends through an aperture 86a formed in a distal end 88 of the first arm 58a of the second frame member 20, an aperture 86c formed in a distal end 90a of the body 78, and an aperture 86b formed in a distal end 89 of the second arm 58b of the second frame member 20. In this way, the actuator 74 is coupled to the second frame member 20. A nut 84b may be threadably engaged to the fastener 84a.

The protrusion 80a extends laterally outwardly from a first side 92a of the body 78 and is adapted to be slidably received in the elongated opening 36 of the arm 30. The protrusion 80b extends laterally outwardly from a second side 92b of the body 78 and is adapted to be slidably received in the elongated opening 50 of the second beam member 26.

The arm 82 extends from a proximal end 90b of the body 78 and includes a first member 82a, a second member 82b, and a third member 82c. The first member 82a extends downwardly from the proximal end 90b of the body 78. The second member 82b extends downwardly and in the second longitudinal direction X2 from an end of the first member 82a. The third member 82c extends downwardly and in the first longitudinal direction X1 from an end of the second member 82b. An engagement pad 93 is formed on an end of the third member 82c and includes a flat surface 94 that is adapted to engage the object being moved from one plate to another. In some configurations, the surface 94 of the engagement pad 93 may be arcuate instead of flat. In some configurations, a gripping pad may be coupled to the engagement pad 93 and adapted to facilitate grasping of the object.

With reference to FIGS. 1-10, the locking member 76 is U-shaped or C-shaped and is translatably coupled to the first frame member 18 in a vertical direction. The locking member 76 include a first side arm 98, a second side arm 100, and a connecting member 102 that interconnects the first side arm 98 and the second side arm 100 to each other. As shown in FIGS. 2 and 3, the first side arm 98 extends vertically and includes an opening 104 formed in an upper surface thereof. The first side arm 98 also includes a recess 106 having an upper inclined surface 108 that is adapted to engage the protrusion 80a of the actuator 74.

The second side arm 100 extends vertically and includes an opening 110 formed in an upper surface thereof. The second side arm 100 also includes a recess 112 having an upper inclined surface 113 that is adapted to engage the protrusion 80b of the actuator 74.

A first fastener 114a such as a bolt or screw extends through a first opening 116a in an upper plate 118 and at least partially through the opening 104 in the first side arm 98, thereby coupling the upper plate 118 and the locking member 76 to each other. A second fastener 114b such as a bolt or screw extends through a second opening 116b in the upper plate 118 and at least partially through the opening 110 in the second side arm 100, thereby further coupling the upper plate 118 and the locking member 76 to each other. A third fastener 114c such as a bolt or screw extends through a third opening 116c in the upper plate 118, the elongated opening 83 in the body 78, an opening 120 in the connecting member 102, the cylindrical opening formed by the groove 59a and the groove 45a, and the cylindrical opening formed by the groove 59b and the groove 45b. A nut 122 may be threadably engaged to the third fastener 114c. In this way, the upper plate 118 is further coupled to the locking member 76.

With reference to FIGS. 1-10, a biasing device 123 (e.g., a spring) surrounds a portion of the third fastener 114c and is positioned between the connecting member 102 and the first frame member 18. The biasing device 123 engages the connecting member 102 and the first frame member 18. In this way, the biasing device 123 biases locking member 76 away from the first frame member 18 in the vertical direction. Although the biasing device 123 is shown as a spring, the biasing device 123 may be an elastomeric pad or any other suitable device that is allowed to bias the locking member 76 away from the first frame member 18.

With continued reference to FIGS. 1-10, operation of the mechanical device 10 will now be described in detail. When the mechanical device 10 is moved toward the object (not shown) to be picked up, the engagement pad 93 engages the object which causes the actuator 74 and the second frame member 20 to move in the second longitudinal direction X2. As the actuator 74 moves in the second longitudinal direction X2, the protrusions 80a, 80b engage the upper inclined surfaces 108, 113 (FIG. 7), respectively, which, in turn, causes the locking member 76 to move upwardly in the vertical direction (the locking member 76 overcomes the biasing force of the biasing device 123 and moves upwardly). Once the protrusions 80a, 80b move passed the upper inclined surfaces 108, 113, respectively, the biasing device 123 biases the locking member 76 downwardly in the vertical direction. In this way, the actuator 74 and the second frame member 20 are inhibited from moving in the first longitudinal direction X1 (FIG. 8; the protrusions 80a, 80b contact the first and second side arms 98, 100, respectively, to inhibit the actuator 74 and the second frame member 20 from moving in the first longitudinal direction X1). It should also be understood that the third fastener 114c traverses the elongated opening 83 in the body 78 as the actuator 74 moves in the second longitudinal direction X2.

Figure 5:
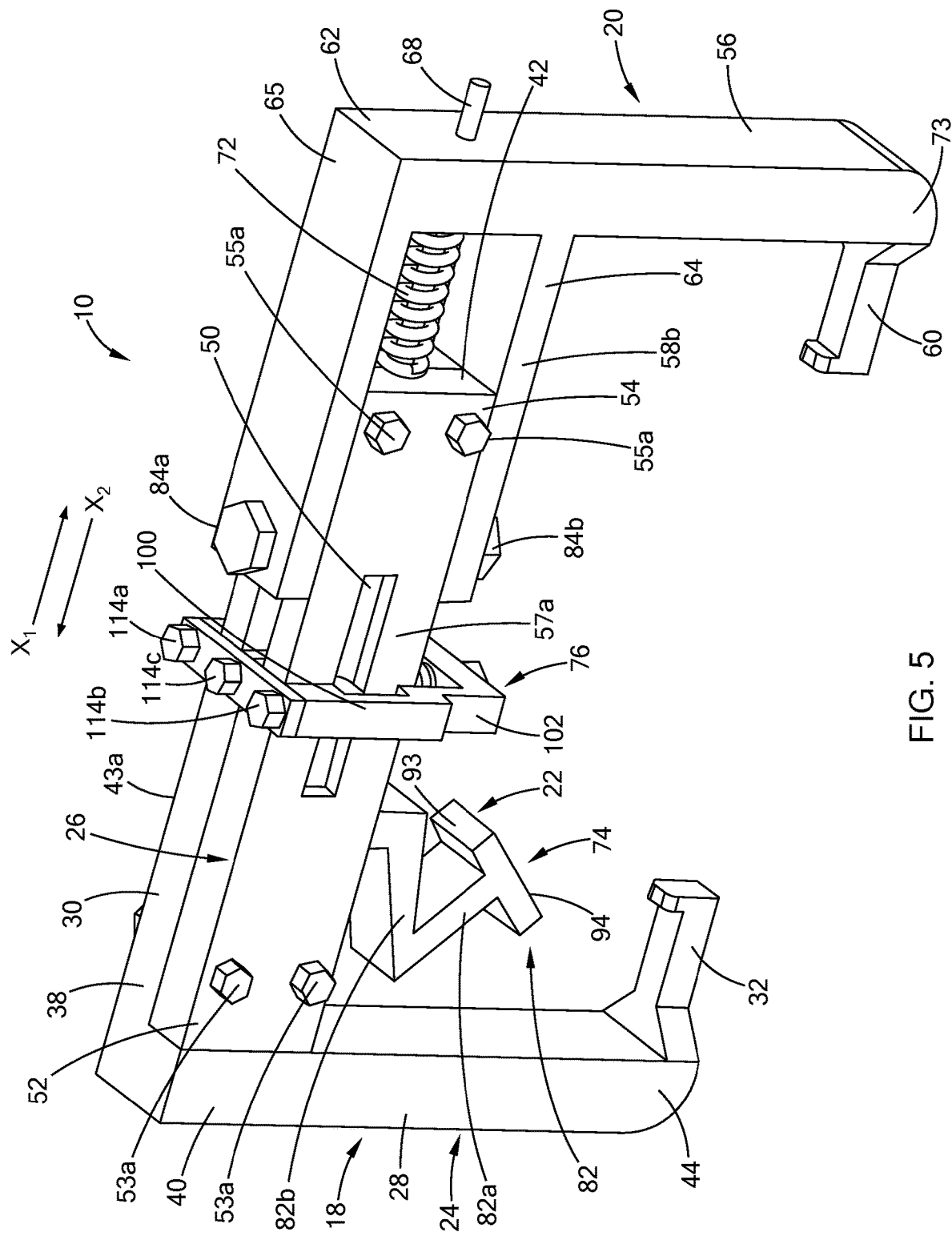
FIG. 5 is a perspective view of the mechanical device being moved from the unlocked position toward a locked position.

As the second frame member 20 moves in the second longitudinal direction X2, the space between the fingers 32, 60 decreases which allows the fingers 32, 60 to grasp and hold the object being moved from one place to another (compare FIGS. 1 and 5, for example).

Figure 10:
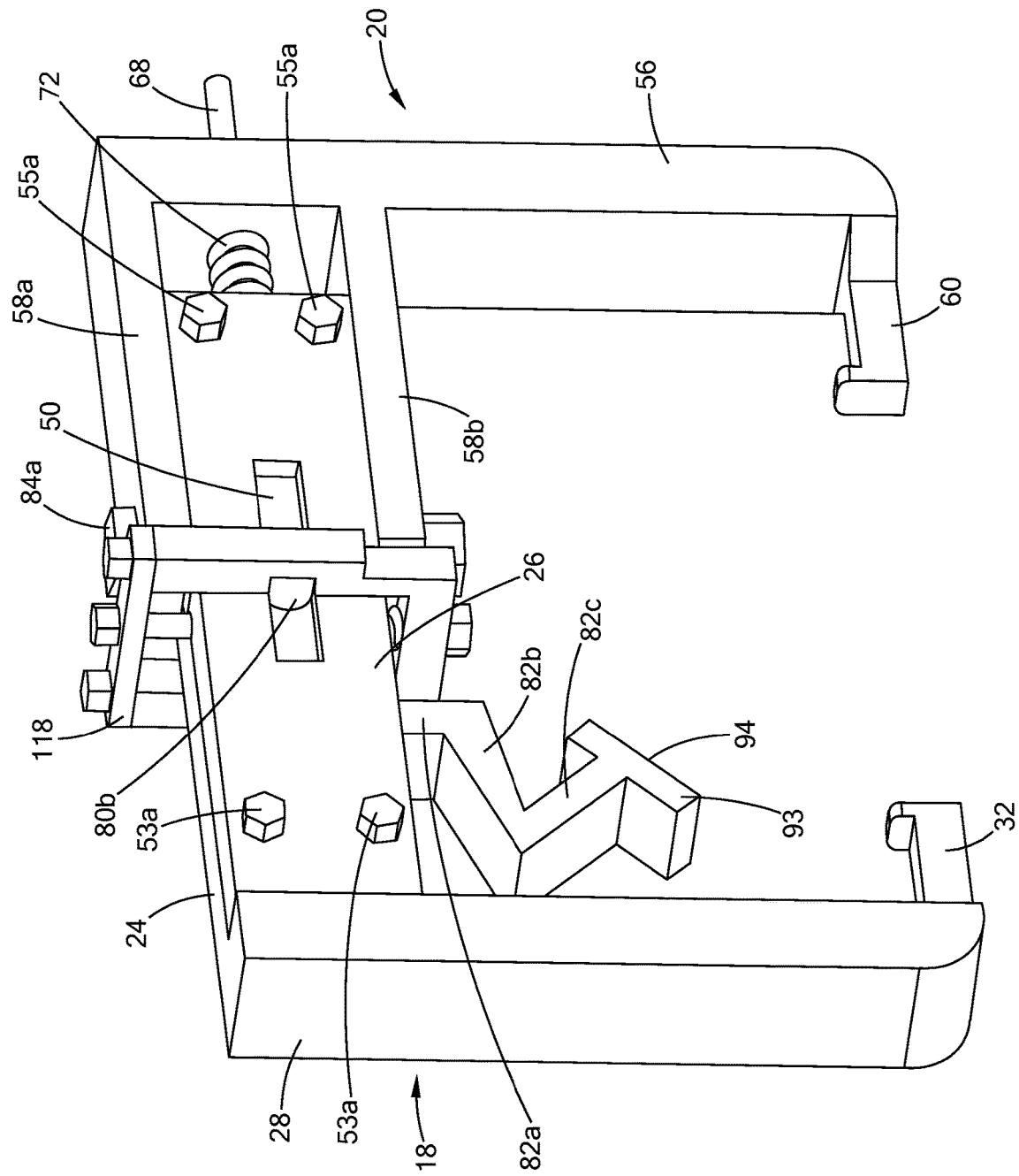
FIG. 10 is a perspective view of the mechanical device with a locking member of the mechanical device moved upwardly in the vertical direction.

When the object is moved to the proper location, an operator may move the locking member 76 upwardly in the vertical direction causing the recesses 106, 112 to align with the protrusions 80a, 80b, respectively (FIG. 10). In this way, the actuator 74 and the second frame member 20 are allowed to move in the first longitudinal direction X1, thereby detaching the mechanical device 10 from the object. It should be understood that the third fastener 114c traverses the elongated opening 83 in the body 78 as the actuator 74 moves in the first longitudinal direction X1.

The mechanical device 10 of the present disclosure provides the benefit of allowing heavy objects to be moved from one place to another in areas where electrical power is limited or otherwise not available.

Figure 11:
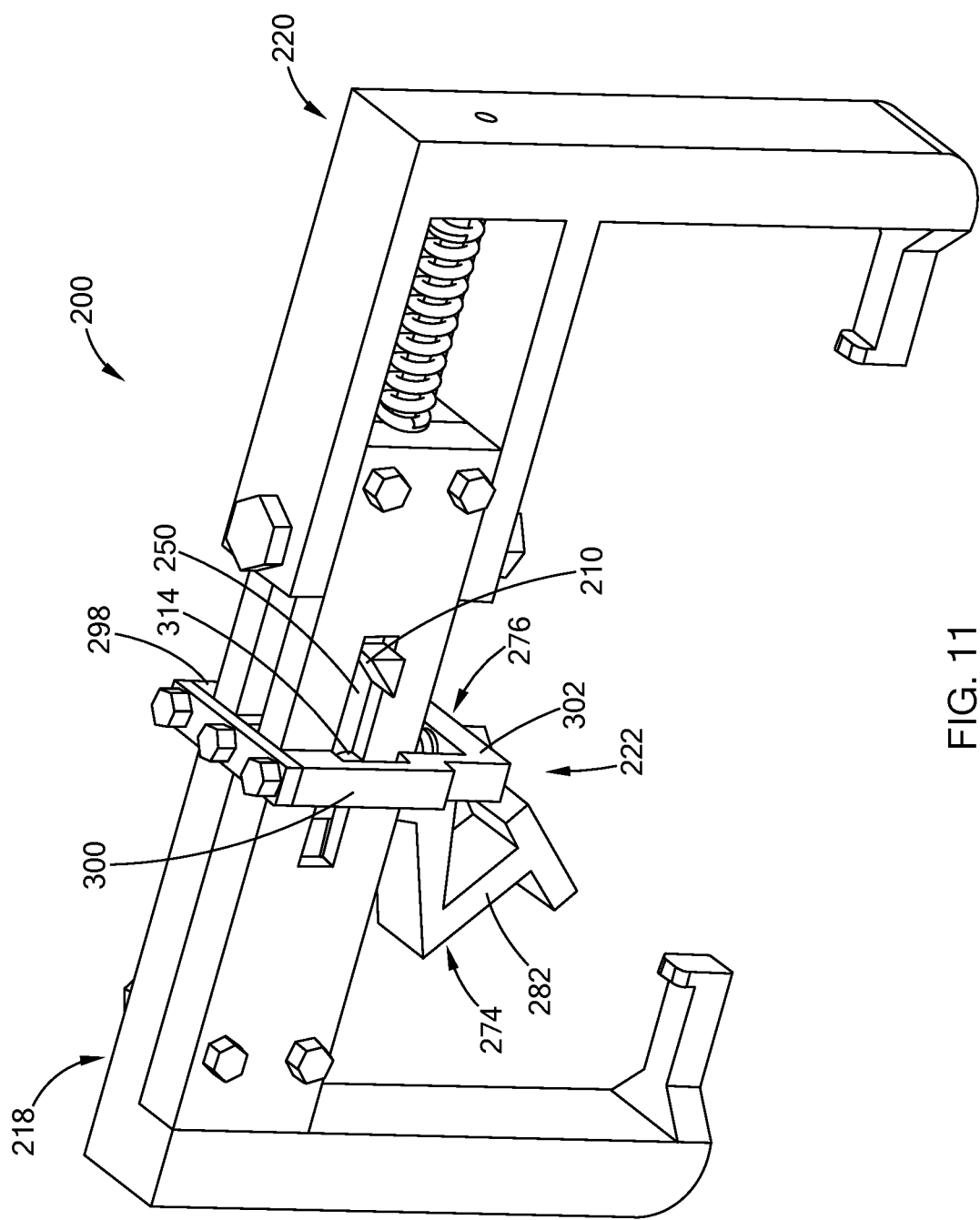
FIG. 11 is a perspective view of an alternate mechanical device.
Figure 12:
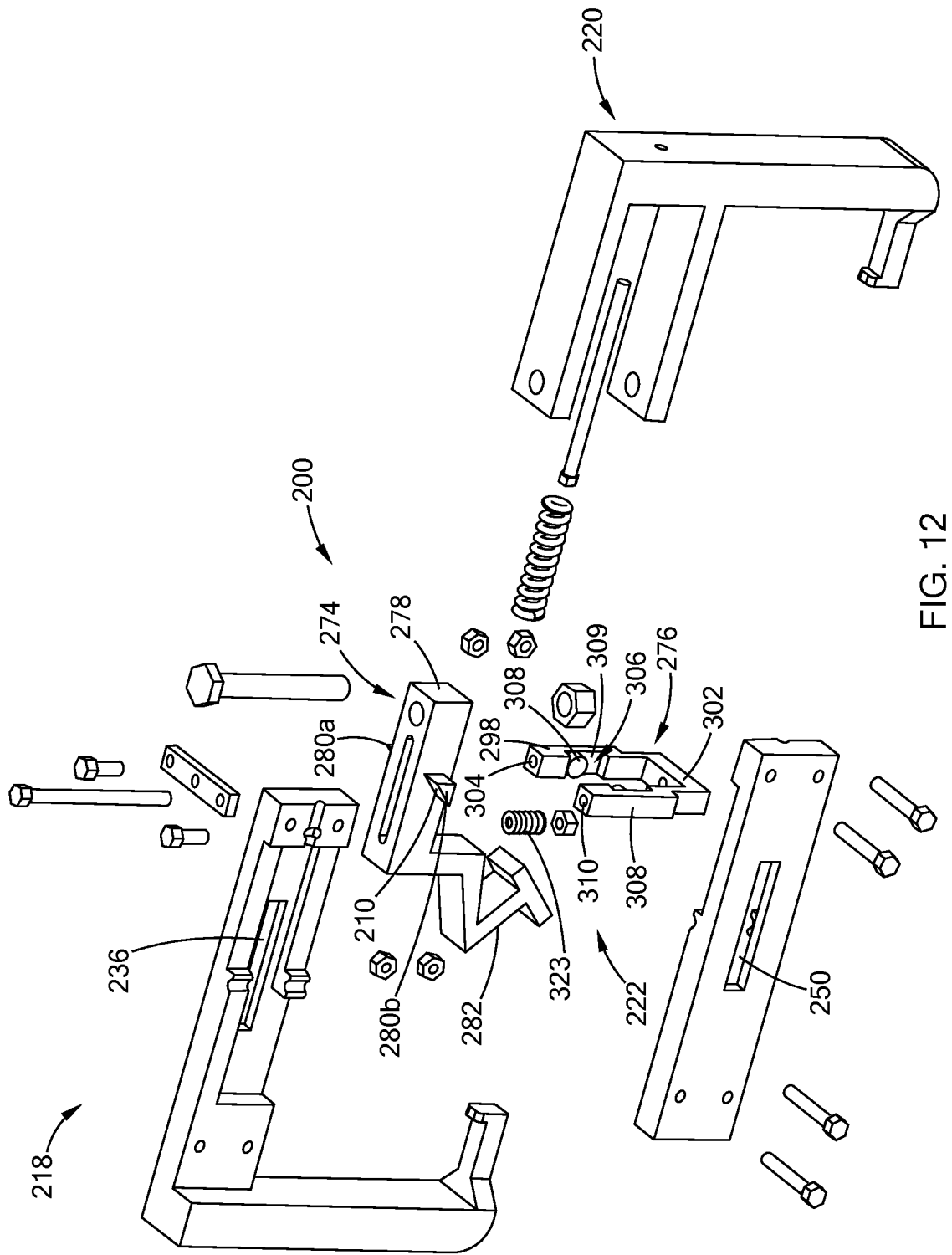
FIG. 12 is an exploded view of the mechanical device of FIG. 11.
Figure 13:
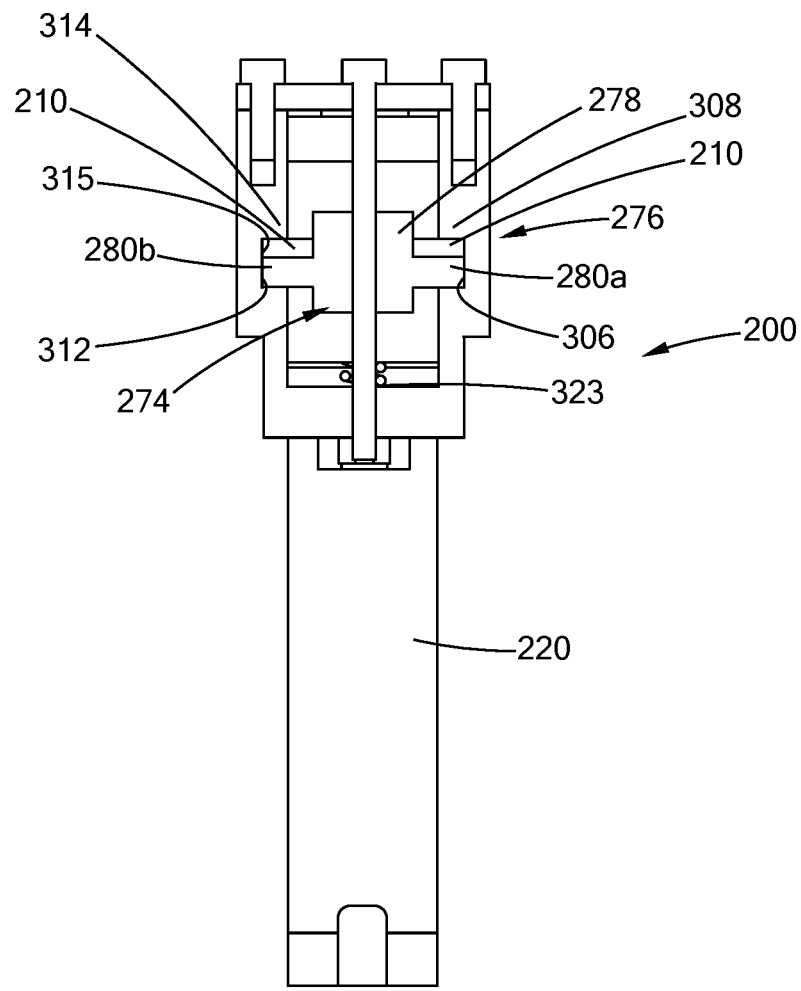
FIG. 13 is a cross-sectional view of the mechanical device of FIG. 11.

With reference to FIGS. 11-13, another mechanical device 200 is provided. The structure and function of the mechanical device 200 may be similar or identical to that of mechanical device 10 described above, apart from any exceptions noted below.

The mechanical device 200 includes a first frame member 218, a second frame member 220, and an actuation assembly 222. The structure and function of the first and second opposed frame members 218, 220 may be similar or identical to that of the frame members 18, 20, respectively, described above, and therefore, will not be described again in detail.

The actuation assembly 222 includes an actuator 274 and a locking member 276. The actuator 274 is coupled to the second frame member 220 and is slidably disposed relative to the first frame member 218. The actuator 274 includes a body 278, a pair of protrusions 280a, 280b, and an arm 282. The structure and function of the body 278 may be similar or identical to that of body 78 described above, and therefore, will not be described again in detail.

The triangular-shaped protrusion 280a extends laterally outwardly from a first side of the body 278 and is adapted to be slidably received in an elongated opening 236 of the first frame member 218. The triangular-shaped protrusion 280b extends laterally outwardly from a second side of the body 278 and is adapted to be slidably received in the elongated opening 250 of the first frame member 218. Each of the protrusions 280a, 280b includes a ramped surface 210. The structure and function of the arm 282 may be similar or identical to that of arm 82 described above, and therefore, will not be described again in detail.

The locking member 276 is U-shaped or C-shaped and is translatably coupled to the first frame member 218 in a vertical direction. The locking member 276 include a first side arm 298, a second side arm 300, and a connecting member 302 that interconnects the first side arm 298 and the second side arm 300 to each other. The first side arm 298 extends vertically and includes an opening 304 formed in an upper surface thereof. The first side arm 298 also includes a recess 306 having a circular shaped protrusion 308 extending laterally inwardly from a vertical surface 309. The protrusion 308 is adapted to engage the protrusion 280a of the actuator 274.

The second side arm 300 extends vertically and includes an opening 310 formed in an upper surface thereof. The second side arm 300 also includes a recess 312 having a circular shaped protrusion 314 extending laterally inwardly from a vertical surface 315. The protrusion 314 is adapted to engage the protrusion 280b of the actuator 274. As the actuator 274 and the second frame member 220 move in the second longitudinal direction X2, the protrusions 308, 314 engage the ramped surfaces 210, which, in turn, causes the locking member 276 to move upwardly in the vertical direction. Once the protrusions 280a, 280b move passed the locking member 276, biasing device 323 biases the locking member 276 downwardly in the vertical direction. The structure and function of the biasing device 323 may be similar or identical to biasing device 23 described above, and therefore will not be described again in detail.

Figure 14:
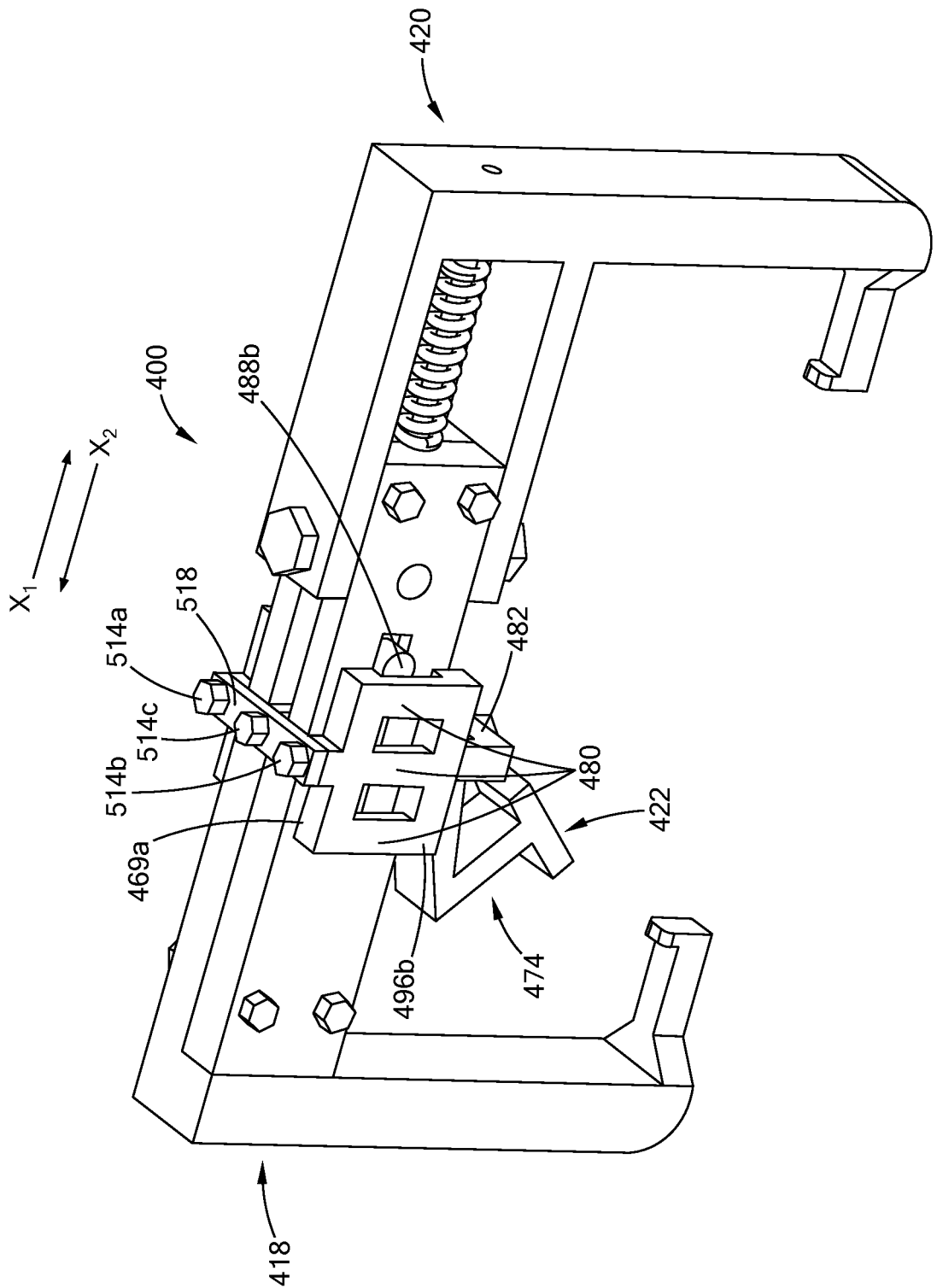
FIG. 14 is a perspective view of yet another alternate mechanical device.
Figure 15:
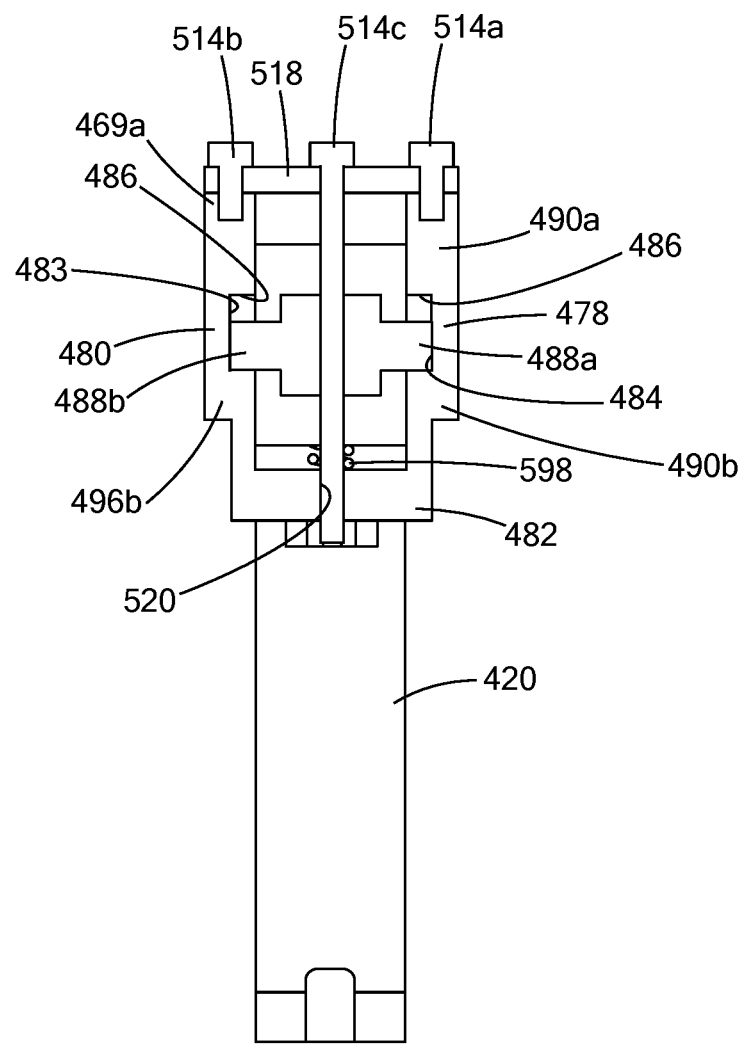
FIG. 15 is a cross-sectional view of the mechanical device of FIG. 14.
Figure 16:
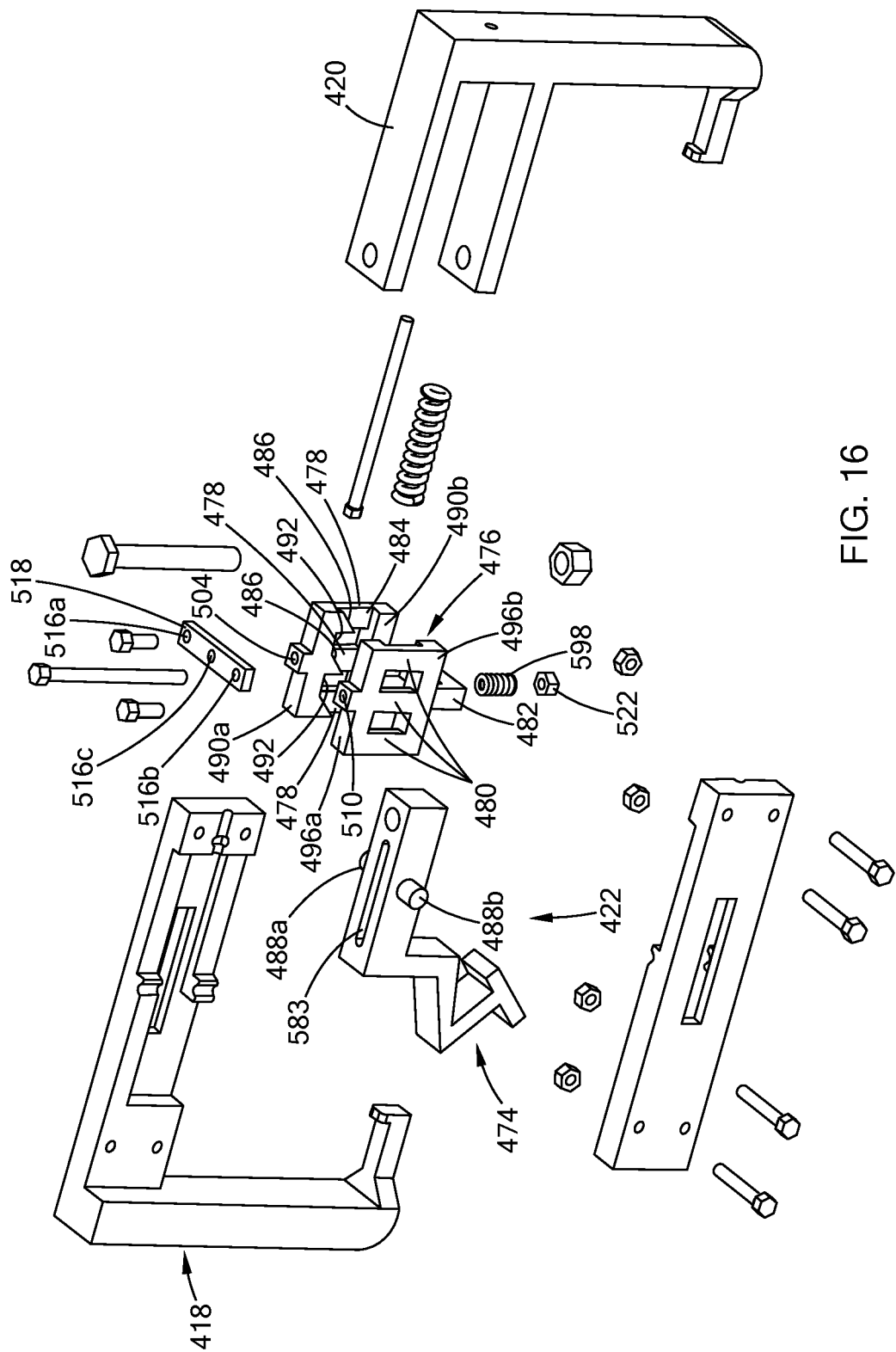
FIG. 16 is an exploded view of the mechanical device of FIG. 14.

With reference to FIGS. 14-16, another mechanical device 400 is provided. The structure and function of the mechanical device 400 may be similar or identical to that of mechanical devices 10, 200 described above, apart from any exceptions noted below.

The mechanical device 400 includes a first frame member 418, a second frame member 420, and an actuation assembly 422. The structure and function of the first and second opposed frame members 418, 420 may be similar or identical to that of the frame members 18, 20, respectively, described above, and therefore, will not be described again in detail.

The actuation assembly 422 includes an actuator 474 and a locking member 476. The structure and function of the actuator 474 may be similar or identical to that of actuator 74 described above, and therefore, will not be described again in detail.

The locking member 476 includes a plurality of first side arms 478, a plurality of second side arms 480, and a connector member 482. The first side arms 478 are spaced apart from each other and each includes a recess 484. The first side arms 478 are connected to each other via upper and lower attachment members 490a, 490b. The second side arms 480 are spaced apart from each other and each includes a recess 483. The recess 484 of the first side arms 478 and the recess 483 of the second side arms 480 each include an upper inclined surface 486 adapted to engage a respective protrusion 488a, 488b of the actuator 474. The second side arms 480 are connected to each other via upper and lower attachment members 496a, 496b. Each first side arm 478 corresponds to a respective second side arm 480 thereby forming a set of opposed side arms 478, 480. The connector member 482 is attached to the lower attachment members 490b, 496b and includes an opening 520 formed therein.

A first fastener 514a such as a bolt or screw extends through a first opening 516a in an upper plate 518 and at least partially through the opening 504 in the upper attachment member 490a, thereby coupling the upper plate 518 and the locking member 476 to each other. A second fastener 514b such as a bolt or screw extends through a second opening 516b in the upper plate 518 and at least partially through the opening 510 in the upper attachment member 496a, thereby further coupling the upper plate 518 and the locking member 476 to each other. A third fastener 514c such as a bolt or screw extends through a third opening 516c in the upper plate 518, an elongated opening 583 in the actuator 474, the opening 520 in the connecting member 482, and the first frame member 418. A nut 522 may be threadably engaged to the third fastener 514c. In this way, the upper plate 518 is further coupled to the locking member 476.

As the actuator 474 and the second frame member 420 move in the second longitudinal direction X2, the protrusions 488a, 488b of the actuator 474 engage the inclined surfaces 486 of a set of opposed side arms 478, 480, which, in turn, causes the locking member 476 to move upwardly in the vertical direction. Once the protrusions 488a, 488b move passed the inclined surfaces 486 and are received in gaps 492 between two sets of opposing first and second side arms 478, 480, the locking member 476 is biased downwardly via a biasing device 598 and the actuator 474 and the second frame member 420 are inhibited from moving in the longitudinal direction. In this way, the mechanical device 400 is allowed to lock in a plurality of locking positions between the open and closed positions.

Figure 17:
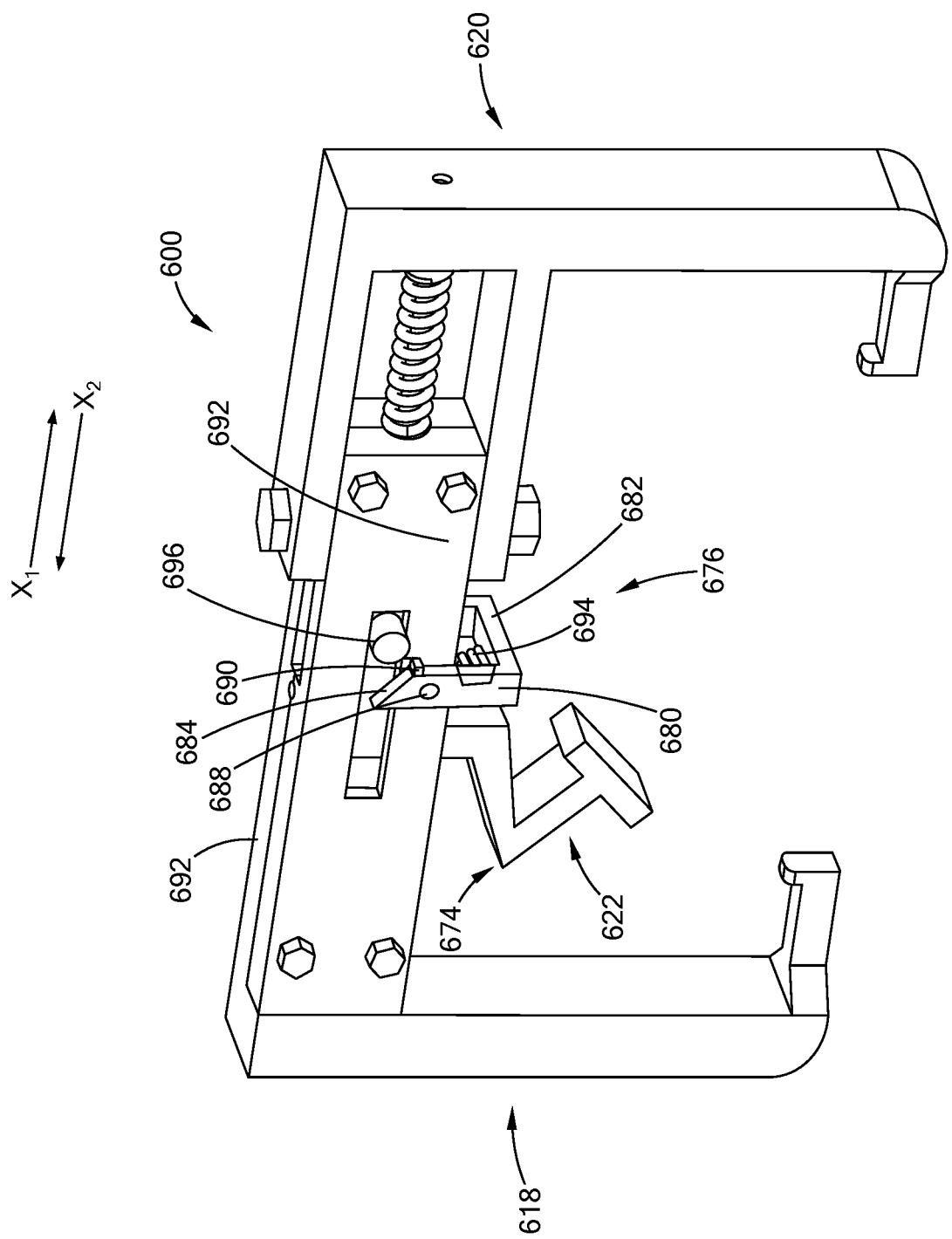
FIG. 17 is a perspective view of yet another alternate mechanical device.
Figure 18:
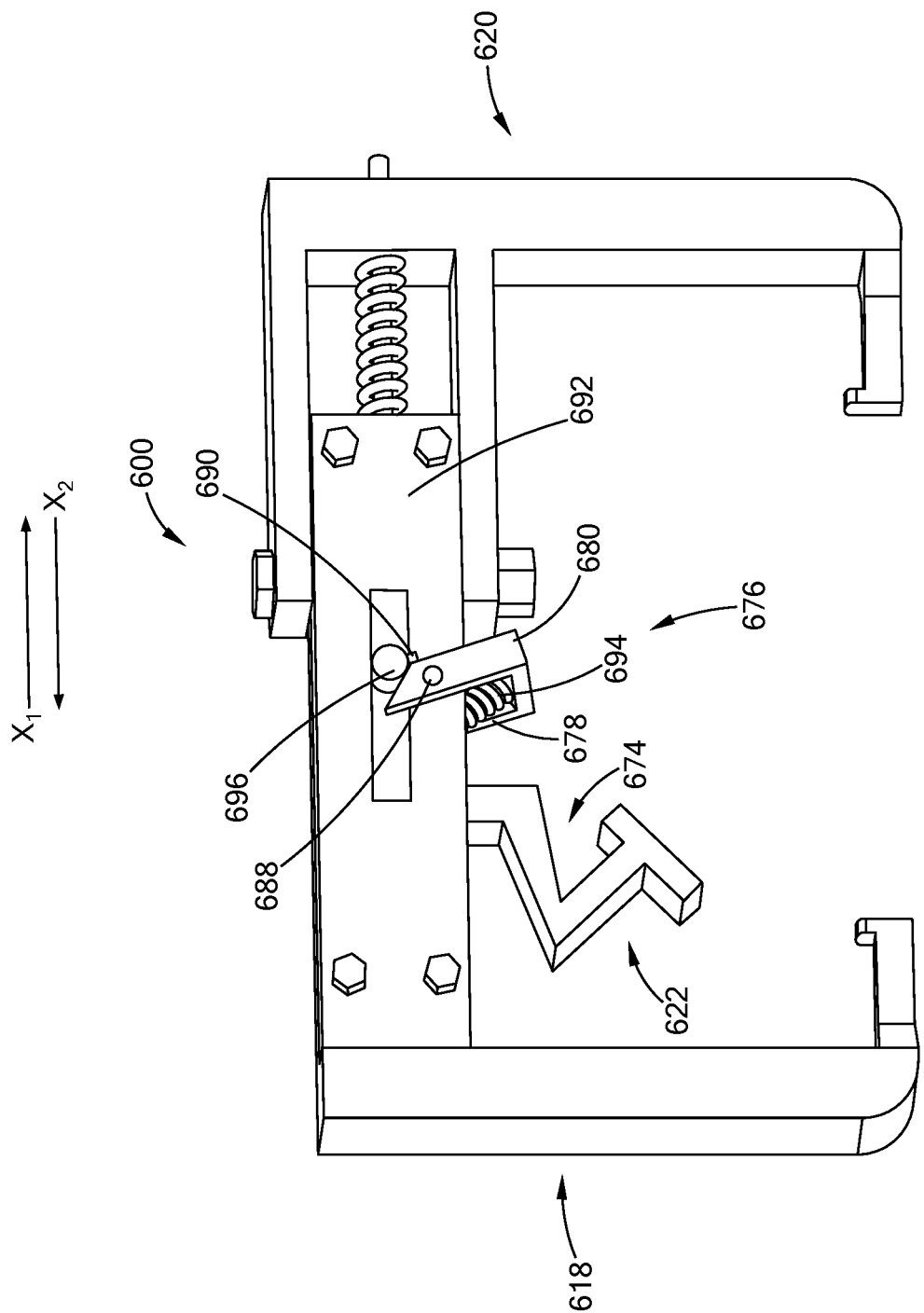
FIG. 18 is a perspective view of the mechanical device of FIG. 17 being moved from the closed position toward the open position.

With reference to FIGS. 17-18, another mechanical device 600 is provided. The structure and function of the mechanical device 600 may be similar or identical to that of mechanical devices 10, 200, 400 described above, apart from any exceptions noted below.

The mechanical device 600 includes a first frame member 618, a second frame member 620, and an actuation assembly 622. The structure and function of the first and second opposed frame members 618, 620 may be similar or identical to that of the frame members 18, 20, respectively, described above, and therefore, will not be described again in detail.

The actuation assembly 622 includes an actuator 674 and a locking member 676. The structure and function of the actuator 674 may be similar or identical to that of actuator 74 described above, and therefore, will not be described again in detail.

The locking member 676 includes a first side arm 678, a second side arm 680, and a connecting member 682 that interconnects the first side arm 678 and the second side arm 680 to each other. Each of the first and second side arms 678, 680 includes a lower ramped or inclined surface 684 (only one shown in the figures). A pivot pin 688 extends through the first and second side arms 678, 680 and the first frame member 618 thereby rotatably coupling the locking member 676 to the first frame member 618. A pair of nubs 690 (only one shown in the figures) extend from opposing sides 692 of the first frame member 618 to inhibit the locking member 676 from rotating in a clockwise direction from the rest or initial position.

A biasing device 694 engages the connecting member 682 and the first frame member 618 and rotationally biases the locking member 676 in the clockwise direction.

As the actuator 674 and the second frame member 620 move in the second longitudinal direction X2, protrusions 696 (only one shown in the figures) of the actuator 674 engage the ramped surfaces 684, which, in turn, causes the locking member 676 to rotate in the counterclockwise direction. Once the protrusions 696 move passed the locking member 676, the biasing device 694 biases the locking member 676 to the rest position. When moving the actuator 674 and the second frame member 620 in the first longitudinal direction X1, the operator first rotates the locking member 676 in the counterclockwise direction such that the first and second side arms 678, 680 do not block or come in contact with the protrusions 696 of the actuator 674. The mechanical device 600 then moves to the open position (i.e., the actuator 674 and the second frame member 620 moves in the first longitudinal direction X1).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mechanical device for grasping an object, the mechanical device comprising:
   opposed frame members slidably coupled to each other in a longitudinal direction, the opposed frame members further being biased away from each other;
   an actuator assembly mounted to the opposed frame members, the actuator assembly comprising:
   an actuator comprising an engagement pad, a body and at least one lateral protrusion extending laterally from the body, the actuator being slidably disposed relative to one of the opposed frame members along the longitudinal direction; and
   a locking member kinematically coupled to the actuator and slidably disposed relative to the other opposed frame member, the locking member comprising an inclined surface adapted to engage the at least one lateral protrusion.

2. The mechanical device according to claim 1, further comprising a first biasing device engaging the opposed frame members.

3. The mechanical device according to claim 2, wherein one of the opposed frame members includes an opening that receives the first biasing device and a portion of the other frame member.

4. The mechanical device according to claim 2, further comprising a second biasing device engaging the one opposed frame member and the locking member and biasing the locking member away from the one opposed frame member.

5. The mechanical device according to claim 4, wherein the first and second biasing devices are springs.

6. The mechanical device according to claim 1, wherein each of the opposed frame members includes a finger extending from an end thereof and adapted to hold the object, and wherein the fingers extend toward each other.

7. The mechanical device according to claim 1, wherein each of the opposed frame members are C-shaped.

8. The mechanical device according to claim 1, further comprising a gripping pad coupled to the engagement pad of the actuator and adapted to facilitate grasping of the object.

9. The mechanical device according to claim 1, further comprising a fastener extending through the actuator and the other opposed frame member to secure the actuator and the other opposed frame member to each other.

10. A mechanical device for grasping an object, the mechanical device comprising:
    opposed frame members slidably coupled to each other in a longitudinal direction, the opposed frame members further being biased away from each other;
    an actuator assembly mounted to the opposed frame members, the actuator assembly comprising:
    an actuator being slidably disposed relative to one of the opposed frame members along the longitudinal direction and comprising an engagement pad; and
    a locking member coupled to the actuator, the locking member being biased away from the one opposed frame member and slidably disposed relative to the other opposed frame member,
    wherein one of the actuator and the locking member comprises at least one lateral protrusion and the other of the actuator and the locking member comprises at least one recess having an inclined surface adapted to engage the at least one lateral protrusion, the locking member adapted to move in a vertical direction when the inclined surface engages the at least one lateral protrusion.

11. The mechanical device according to claim 10, further comprising a first biasing device engaging the opposed frame members and biasing the opposed frame members away from each other.

12. The mechanical device according to claim 11, further comprising a second biasing device engaging the one opposed frame member and the locking member and biasing the locking member away from the one opposed frame member.

13. A mechanical device for grasping an object, the mechanical device comprising:
    first and second opposed frame members slidably coupled to each other in a longitudinal direction, the first and second frame members further being biased away from each other;
    an actuator assembly mounted to the first and second frame members, the actuator assembly comprising:
    an actuator being slidably disposed relative to the first frame member along the longitudinal direction and comprising a body, an engagement pad and a plurality of protrusions, a first protrusion of the plurality of protrusions extending laterally from a first side of the body and a second protrusion of the plurality of protrusions extending laterally from a second side of the body that opposes the first side of the body; and
    a locking member moveably coupled to the actuator in a vertical direction and comprising a plurality of first side arms and a plurality of second side arms, each of the first and second side arms includes a recess having an inclined surface adapted to engage a respective first and second protrusion of the plurality of the protrusions.

14. The mechanical device according to claim 13, wherein the first frame member comprises:

a first beam member having a first elongated opening extending in the longitudinal direction and adapted to receive the first protrusion; and a second beam member cooperating with the first beam member to house the body of the actuator, the second beam member having a second elongated opening extending in the longitudinal direction and adapted to receive the second protrusion.

15. The mechanical device according to claim 13, further comprising:

an upper plate;

a first fastener extending through the upper plate and at least partially through a first attachment member connecting the first side arms to each other;

a second fastener extending through the upper plate and at least partially through a second attachment member connecting the second side arms to each other;

a biasing device engaging the first frame member and the locking member and biasing the locking member away from the first frame member; and a third fastener extending through the upper plate, the body of the actuator, the biasing device, and the locking member.

16. The mechanical device according to claim 15, wherein the body includes an elongated slot extending in the longitudinal direction, and wherein the third fastener extends through the elongated slot.

17. The mechanical device according to claim 13, wherein the locking member is C-shaped.

18. The mechanical device according to claim 13, further comprising a biasing device engaging the first and second frame members.

19. The mechanical device according to claim 13, further comprising a biasing device engaging the first frame member and the locking member.

20. The mechanical device according to claim 13, wherein the first and second protrusions of the actuator are configured to be received in gaps between two sets of opposing first and second side arms to inhibit the actuator and the second frame member from moving in the longitudinal direction.

* * * * *